United States Patent

Tredoulat

[11] Patent Number: 5,984,471
[45] Date of Patent: Nov. 16, 1999

[54] SPECTACLES HAVING RETRACTABLE SIDE ARMS WITHIN THE UPPER FRAME BODY

[76] Inventor: RenëTredoulat, 98 Avenue Galliëni, Le Vesinet, France

[21] Appl. No.: 08/981,550
[22] PCT Filed: Jun. 19, 1996
[86] PCT No.: PCT/FR96/00944
§ 371 Date: Dec. 19, 1997
§ 102(e) Date: Dec. 19, 1997
[87] PCT Pub. No.: WO97/01124
PCT Pub. Date: Jan. 9, 1997

[30] Foreign Application Priority Data

Jun. 20, 1995 [FR] France .................................. 95-07338

[51] Int. Cl.$^6$ .................. G02C 5/08; G02C 5/14
[52] U.S. Cl. ............... 351/41; 351/63; 351/119; 351/153; 16/228
[58] Field of Search ................ 351/41, 63, 111, 351/113, 114, 119, 121, 140, 153; 2/254; 16/228

[56] References Cited

U.S. PATENT DOCUMENTS 2,753,762  7/1956  Dorgelys .................... 351/41
4,887,896  12/1989  Akagi ......................... 351/63

FOREIGN PATENT DOCUMENTS

| 0239011 | 9/1987 | European Pat. Off. . |
| 0354051 | 2/1990 | European Pat. Off. . |
| 2619934 | 3/1989 | France . |
| 2623919 | 6/1989 | France . |
| 2716014 | 8/1995 | France . |
| 3230234 | 2/1984 | Germany .................... 351/63 |
| 2216283 | 10/1989 | United Kingdom . |

*Primary Examiner*—Huy Mai
*Attorney, Agent, or Firm*—Ostrolenk, Faber, Gerb & Soffen, LLP

[57] ABSTRACT

Spectacles frame comprising a frame body (10) and two side arms (12, 14) insertable into the upper portion (24) of the body and withdrawable therefrom into the use position. The side arm housings in the upper portion (24) consist of a single tube (26) into which both side arms may be fitted. The tube has tow opposite open ends (30, 32) at opposite side ends of the upper portion (24) of the body (20). The front ends (12a, 14a) of the side arms (12, 14) are tapered and the side arms may be folded across one another so that both may be inserted into the tube (26).

11 Claims, 5 Drawing Sheets

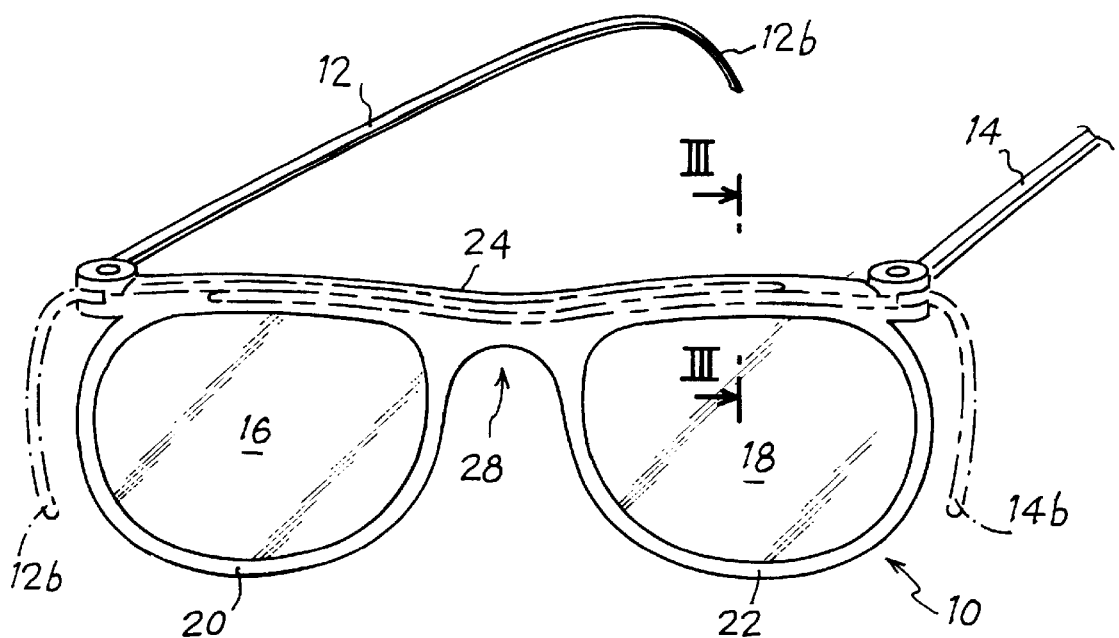
FIG_1
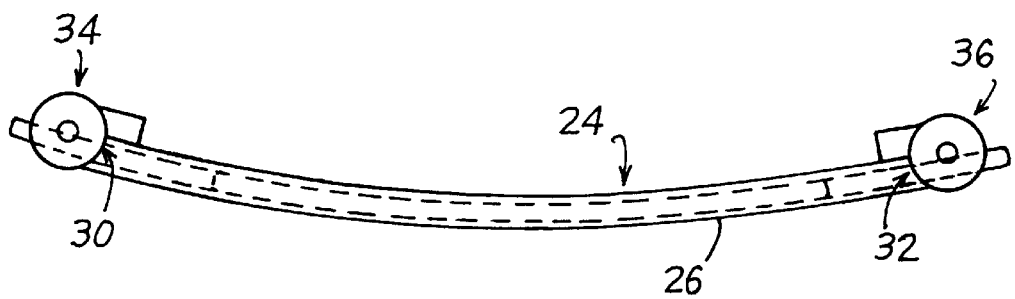
FIG_2
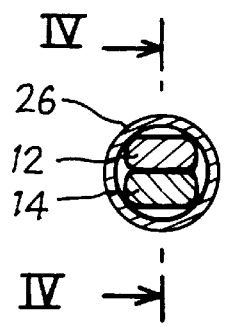
FIG_3
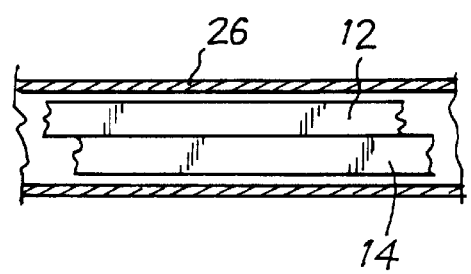
FIG_4

FIG_5
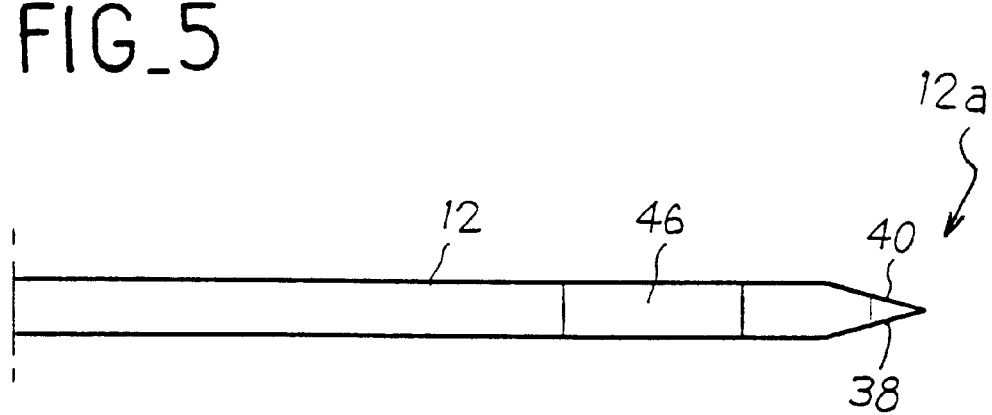
FIG_6
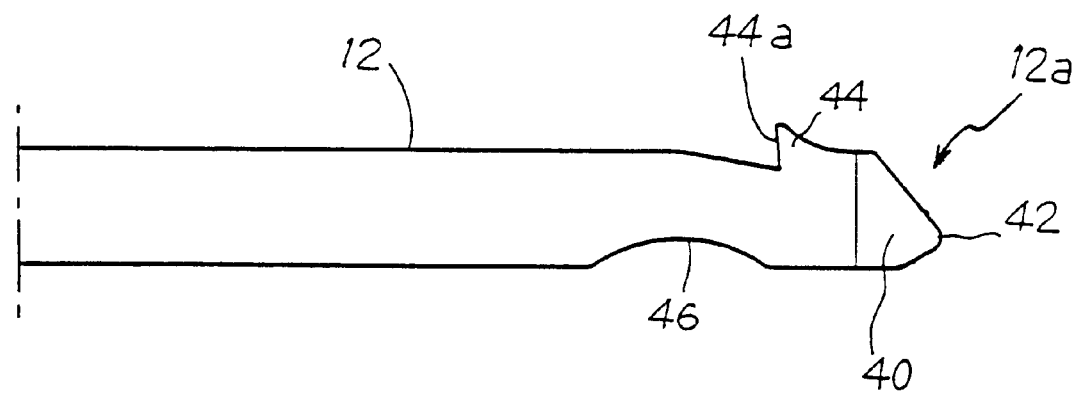

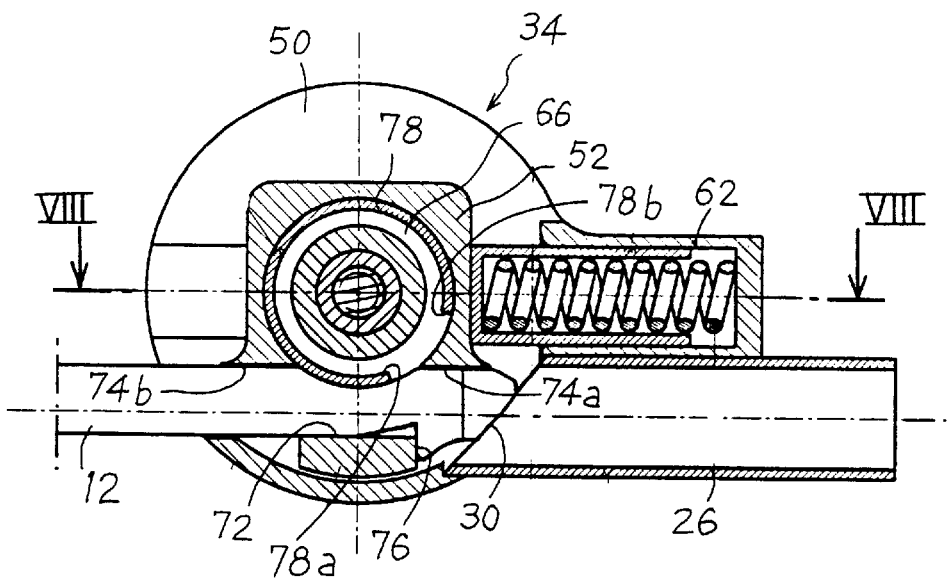
FIG_7
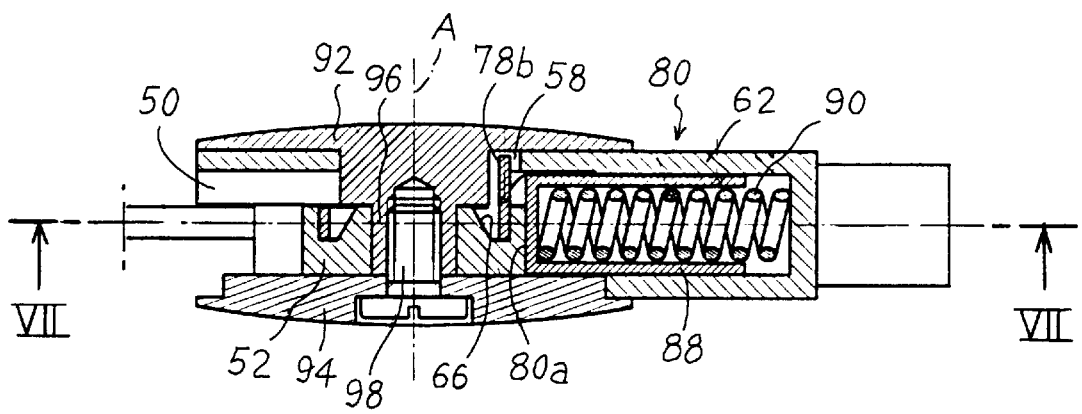
FIG_8

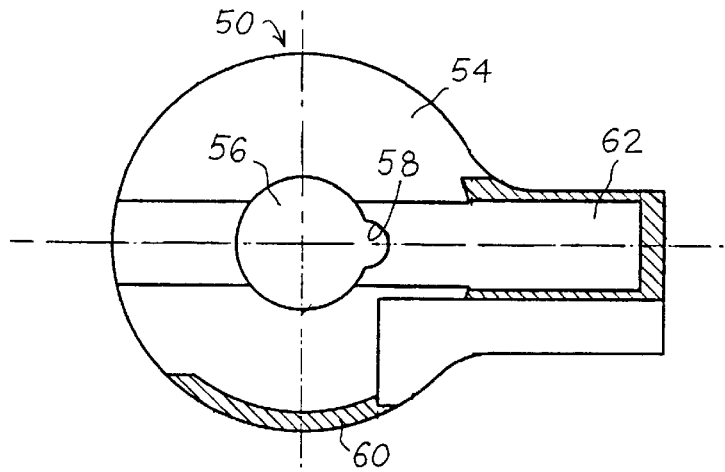
FIG_9
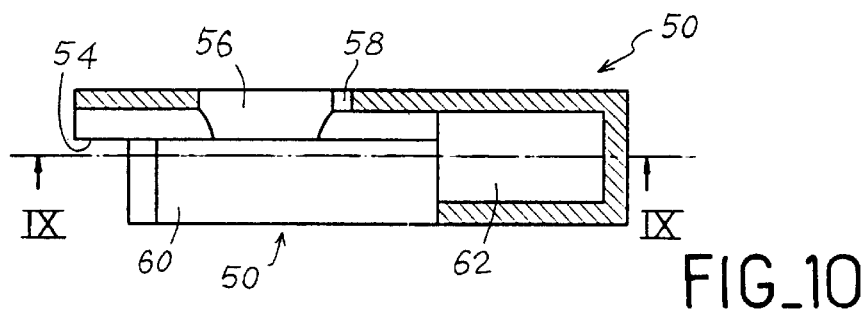
FIG_10
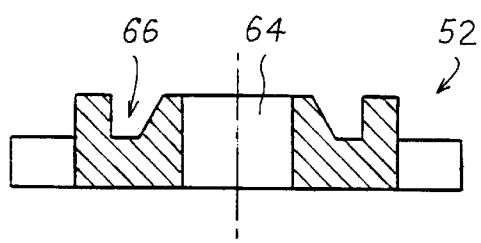
FIG_11
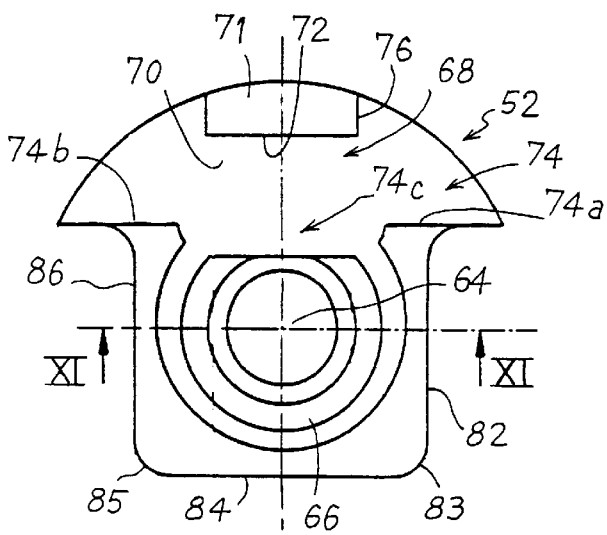
FIG_12

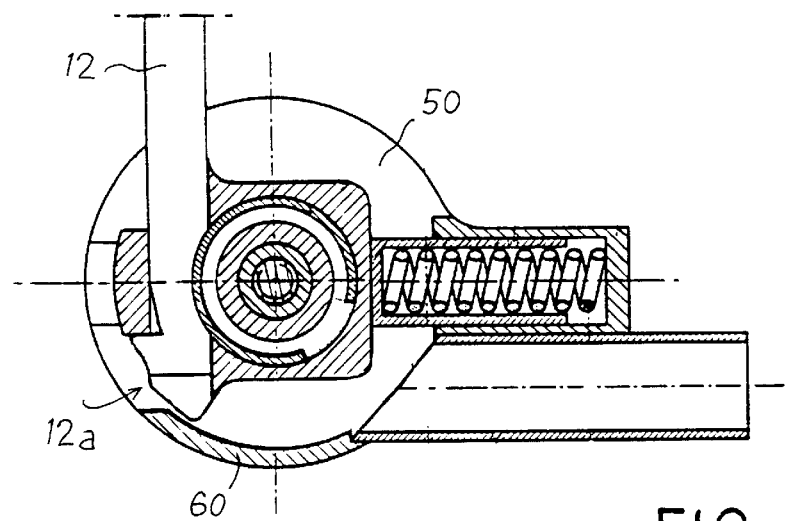
FIG_13
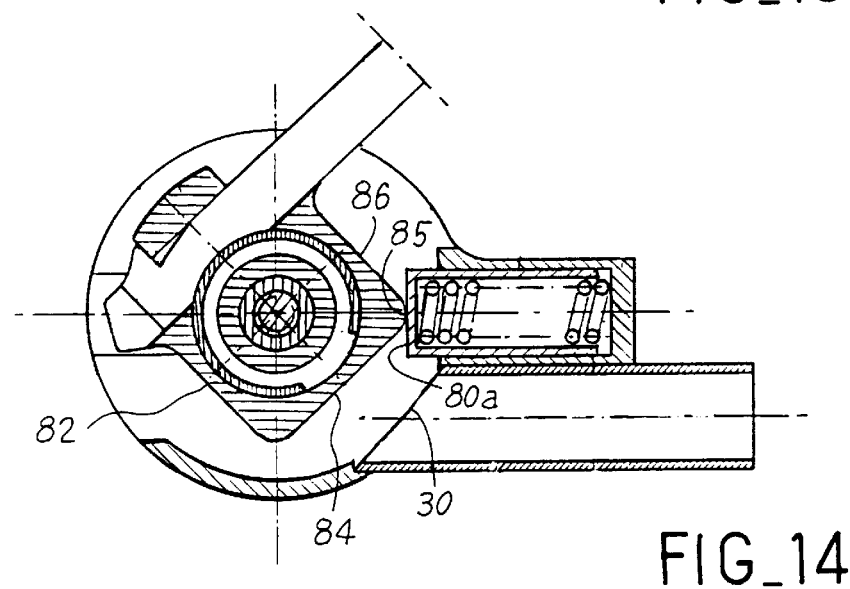
FIG_14
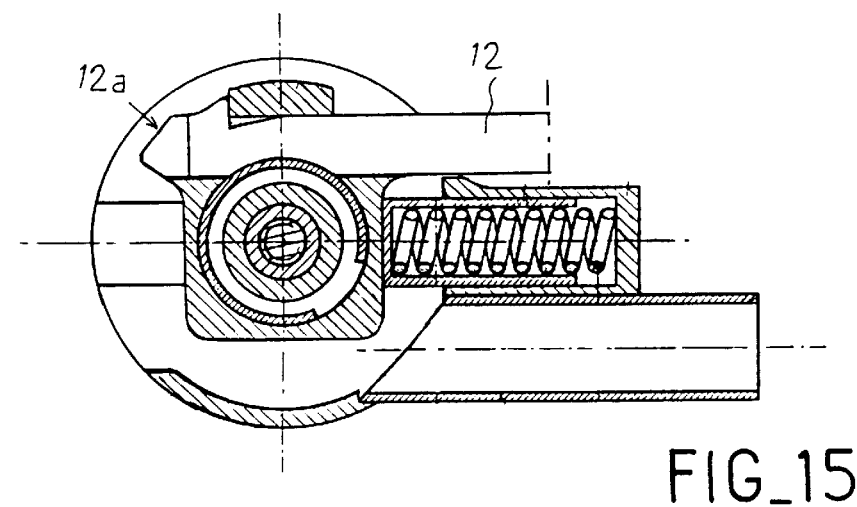
FIG_15

SPECTACLES HAVING RETRACTABLE SIDE ARMS WITHIN THE UPPER FRAME BODY

The present invention relates to a spectacles frame comprising a frame body, two side arms, means for fixing two spectacles lenses to said body, and means forming housing, arranged in an upper portion of the body. The side arms are capable of being at least partially inserted in these housing means in order to adopt a position of rest in which they extend above the locations of the two lenses and of being extracted therefrom in order to adopt a position of use in which they extend in a direction substantially perpendicular to the mean plane of this body. These side arms are flexible and each present a front end and a rear end respectively close to and remote from the frame body in position of use.

The mean plane of the frame body is substantially vertical when the user is wearing the spectacles. In general, the different positions and directions of the various elements of the frame (front, rear, vertical, horizontal) are those of the normal conditions of wear of the frame, in which the lenses are overall vertical, while the side branches are overall horizontal up to the wearer's ears.

European Patent Application No. 0 354 051 discloses a frame of this type, in which the housing means are constituted by two parallel channels, each receiving one of the side arms and formed in the upper bar of the frame. Even if it is attempted to endow the side arms and the tubes with sections which are as reduced as possible, the total dimensions of the housing means are relatively large and the upper bar must consequently be sufficiently thick. Furthermore, the two tubes being parallel, the exits of the two side arms are also parallel and are consequently not aligned in the general direction of the upper bar of the frame. This results in a dissymmetry since the points of connection of the side arms to the frame cannot be located at the same level, either horizontally or vertically. This document also suggests using a single tube, without showing any embodiment with one single tube. Anyway, due to the geometry of the side arms, such a tube would be rather thick and the insertion of the side arms in this tube would be difficult, because they would abut one against another.

The whole is therefore relatively unsightly, due both to the considerable thickness of the upper bar of the frame and to the dissymmetry.

It is an object of the invention to overcome these drawbacks by reducing the thickness of the upper bar of the frame and by making a perfect outer symmetry.

This object is attained thanks to the fact that the housing means are constituted by a single tube adapted to receive the two side arms, this tube being arranged in the upper portion of the frame body, extending, in a so-called "transverse" direction, above the locations of the two lenses, and presenting two open opposite ends, respectively located at a first and at a second lateral end of the upper portion of the frame body, and that the front ends of the side arms are tapered, said side arms being capable of folding across each other in order to be inserted both in said single tube.

The fact of replacing the two tubes of the prior art by a single tube makes it possible to reduce the thickness of the upper portion of the frame since, even if the internal section of the single tube is slightly greater than that of one of the two tubes of the prior art, the thickness of the wall of the tube is found only twice in the section of the upper portion of the frame, whatever the direction considered in this section. On the other hand, in the prior art, in the direction in which the two tubes are juxtaposed, four times the thickness of a tube, in addition to the dimensions of the internal sections of the tubes in this direction, had to be housed.

The two side arms having to be inserted in opposite directions inside the same tube, there is a risk that they mutually hinder each other or even that the insertion is completely blocked if the front ends of the two side arms come into abutment contact with each other. This risk is eliminated thanks to the fact that, according to the invention, the front ends of the two side arms are tapered. In fact, even if they touch each other, it is impossible for an abutment contact to be established and they are naturally deflected with respect to each other, with the result that they are inserted in the single tube without any problem.

The two side arms therefore slide on each other and optimally occupy the internal space of the tube, naturally. It has thus been ascertained that, for a given section of the side arms, the internal section of the single tube may be included only between 1.3 and 1.7 times the section of one of the two tubes of the prior art.

The invention will be more readily understood and its advantages will appear more clearly on reading the following detailed description of an embodiment indicated by way of non-limiting example. The description refers to the accompanying drawings, in which:

FIG. 1 is a schematic view in perspective of a frame according to the invention.

FIG. 2 is a plan view of the frame of FIG. 1.

FIG. 3 is a view in section along line III—III of FIG. 1.

FIG. 4 is a partial view in section along line IV—IV of FIG. 3.

FIGS. 5 and 6 are views in elevation and from above, respectively, of the front end region of a side arm of the frame according to the invention.

FIGS. 7 and 8 are views in section, horizontal and vertical respectively, showing a member for articulation of one of the side arms of the frame.

FIGS. 9 and 10 are views in section, horizontal and vertical respectively, of one of the portions of the articulation member.

FIG. 11 is a vertical section of another portion of this member.

FIG. 12 is a plan view of the portion of FIG. 11, and

FIGS. 13, 14 and 15 are horizontal sections showing the articulation member in several angular positions of the side arm.

The frame of FIG. 1 comprises a frame body 10, two side arms 12 and 14, and two spectacle lenses 16 and 18. In the example shown, this frame comprises conventional lens hoops 20 and 22, to which the lenses may be fixed, by being inserted in appropriate grooves.

The upper portion 24 of the frame comprises means forming housing, constituted by a single tube 26 better visible in FIGS. 3 and 4. In FIG. 1, the side arms 12 and 14 are shown in solid lines in their position of use, in which they are substantially perpendicular to the mean plane of the frame body. They are also shown in broken lines in a position of rest, in which they are inserted in the tube 26 and extend above the locations of the two lenses 16 and 18. In fact, they are inserted over virtually the whole of their length, only their rear end portions 12b and 14b, which are placed behind the wearer's ears, remain outside the tube.

The tube 26 is arranged only in the upper portion 24 of the frame body, with the result that the lens hoops 20 and 22 may be very fine and made of plastics material (acetate), tortoise-shell, or metal. In fact, there is no restraint as to the mode of fixing the lenses 16 and 18 to the frame body 10. For example, the hoops 20 and 22 are not necessarily present, as the lenses may be fixed with the aid of Nylon yarns inserted in grooves in these lenses and fixed to the upper portion 24, or may be directly fixed on this upper portion 24 with the aid of screws traversing them.

Tube 26 extends continuously above the locations of the two lenses and above the bridge of the nose 28, in a so-called "transverse" direction. It presents two opposite ends 30 and 32, respectively located at a first and a second lateral end of the upper part 24 of the frame body 10. The lateral ends are provided with members 34 and 36 for articulation of the side arms 12 and 14.

Tube 26 follows the bridge of the nose and may even serve as bridge. As a function of the desired aesthetics, it may present, in this region, a downward undulation.

FIG. 2 is schematic and shows only the outer contour of the tube 26, indicated by broken lines. It is seen that the tube is curved in order to follow the overall shape of the face. This tube is better visible in FIGS. 3 and 4. It presents a circular section, but it must be understood that its section may be different, possibly rectangular or oval. When they occupy their position of rest, the two side arms 12 and 14 are juxtaposed inside the tube 26.

FIGS. 5 and 6 show, respectively in elevation and in plan view, the front end portion of the side arm 12. These Figures show that the front end 12a is tapered. The front end 14a of the side arm 14 is obviously identical. Thanks to this form, even if the front ends 12a and 14a of the side arms come into contact when they are inserted in the tube 26, no blockage can occur since the side arms deflect mutually from each other and naturally slide on each other. Furthermore, due to their flexibility, they may follow the shape of the curve or undulation of the tube, without their insertion in this tube being rendered more difficult.

More precisely, it is seen in FIG. 5 that the front end 12a comprises two inclined faces 38 and 40 which, in elevation, define a dehedron. In the example shown, these two inclined faces are made on the two largest sides of the section of the side arms. They perform the role of ramps which tend to deflect the two side arms with respect to each other when their front ends come into contact.

The fact of providing these two ramps may suffice to deflect the two side arms, and the inclined faces may effectively be made as a dihedron, in which case their line of intersection constitutes a rectilinear edge. However, as shown in FIG. 6, the line of intersection of the two inclined faces 38 and 40 is overall concave and presents a projecting tip 42. In this way, the frontal surface of the front ends of the side arms is extremely limited and no frontal abutment contact can occur.

This particular shape of the front end of the side arms may be obtained by sharpening, whetting and burring.

It should further be noted that the front end of the side arm 12 comprises a beak 44 presenting a rearwardly directed active face 44a, and a concave zone 46 whose use will be specified hereinafter. The side arm having to be extremely fine, the beak 44 is advantageously constituted by a simple sliver lifted by means of an appropriate tool. In the example shown, the beak 44 and the concave zone 46 are made on two opposite lateral faces of the side arm 12.

The articulation members 34 and 36 each present a channel capable of being placed in a first position in which it is aligned with the corresponding open end of the tube 26 and in a second position substantially perpendicular to the first. It will be understood that, in the first position of the channel, the corresponding side arm may be inserted in the tube or extracted therefrom and that, in the second position of the channel, the corresponding side arm occupies its position of use. The articulation members further comprise means for wedging the front end of the corresponding side arm when the latter is extracted from the tube.

The articulation members 34 and 36 are identical. With reference to FIGS. 7 to 12, member 34 will now be described in greater detail. It comprises a fixed base 50 connected to the end 30 of the tube 26, and a rotating element 52, disposed on the base 50 and capable of rotating with respect thereto about an axis of rotation A.

The base 50 and the element 52 may equally well be disposed one on the other or one under the other, the essential being that they are superposed vertically.

The base 50 of each rotating element is fixed to the tube 26 by any appropriate means, for example by welding. The bases 50 and the rotating elements 52 of the articulation members 34 and 36 are disposed totally symmetrically at each of the two ends of the tube 26, with the result that the levels of extraction of the two side arms are symmetrical.

FIG. 7 is a view in section along line VII—VII of FIG. 8, in which, in order to facilitate understanding, the side arm 12 is shown in outside view. FIG. 8 is a view in vertical section, along line VIII—VIII of FIG. 7.

The fixed base 50 is more clearly seen in FIGS. 9 and 10. It comprises a substantially circular horizontal plate 54 having a central bore 56 presenting a recess 58. It also comprises a portion of front vertical wall 60 and a sleeve 62 extending, substantially parallel to tube 26, to the rear of the frame, and outwardly open. This sleeve has a cylindrical bore pierced therein.

FIGS. 11 and 12 show the rotating element 52. It comprises a bore 64 which comes into alignment with the bore 56 of the base 50. The channel 68 which serves for passage of the side arm is made in an eccentric part of the rotating element 52. It comprise a horizontal base face 70 and two lateral faces 72 and 74. Face 74 is interrupted in its median part and comprises two portions 74a and 74b located on either side of this interruption 74c, which may simply be a recess. An annular groove 66 concentric to the bore 64, open upwardly (towards the plate 54 of the base 50), opens laterally, for a portion of its circumference, on the interruption 74c of the wall 74.

The rotating element 52 likewise presents an abutment face 76 substantially perpendicular to one of the faces of the channel 68 and which, in the first position of the channel, is directed towards the end 30 of the tube 26. In the example shown, the abutment face 76 is perpendicular to the lateral face 72 and arranged in the same eccentric vertical wall element 71. As shown in FIG. 7, when the side arm 12 is extracted from the tube 26, the active face 44a of its beak 44 cooperates in abutment with the abutment face 76 of the rotating element 34, to define the maximum position of extraction of the side arm.

Each articulation member comprises an elastic member capable of projecting in the channel of the rotating element in order to cooperate with the concave zone 46 of the corresponding side arm and to wedge this latter in its position of extraction, and of being elastically retracted in order to allow the side arm to slide in the channel.

More precisely, in the example shown, the elastic member is constituted by a portion of elastic ring 78 which is disposed in the annular groove 66 and is fixed in rotation. Under the effect of its elasticity, this portion of ring 78 tends naturally to project inside the channel 68, being inserted in the interruption 74c of the wall 74. In this way, when the portion of ring 78 is in contact with the running part of the side arm, it retracts inside the annular groove 66 and releases the slide of the side arm inside the tube 26. It is only when the side arm is in its position of extraction out of the tube that the portion of ring 78 cooperates with the concave zone 46 under the effect of its elasticity.

As shown in FIG. 7, the portion of ring 78 has a free end 78a which is angularly close to the end 30 of the tube 26 and a fixed end 78b which is angularly remote from this end 30. In other words, from its extraction out of the tube and during its rotation having to bring it into its position of use, the side arm firstly comes into contact with the portion of ring 78 in the vicinity of its free end 78a and moves progressively closer to the fixed end 78b. The end 78b is raised with respect to the mean plane of the portion of ring 78 and is housed in the recess 58 of the central bore 56 of the fixed base 50, which makes it possible to render the portion of ring 78 fixed in rotation.

The cooperation of the abutment faces 76 and 44a makes it possible to avoid total extraction of the side arm from the rest of the frame, and the cooperation of the concave zone 46 and of the portion of ring 78 makes it possible, when the side arm is aligned with the tube, to oppose a slight resistance to the insertion of the side arm in the tube. The stiffness of the portion of ring 78 increases from its free end 78a up to its fixed end 78b. In this way, as the side arm rotates to adopt its position of use, the resistance to a displacement tending to disengage the abutment faces 76 and 44a, increases. This avoids any untimely slide of the side arm with respect to the channel 68 when it is extracted from the tube. The vertical wall element 60 of the base 50 which prevents the side arm 12 from leaving the articulation element in position of use is therefore not obligatorily present.

Moreover, as is seen in FIG. 15, the side arms may adopt a third position in which they are folded at the rear of the frame. In this third position, no vertical wall element makes an obstacle to a slide of the side arm towards the outside of the articulation member. In this third position, the concave zone 46 is in contact with a part of the spring 78 which presents a considerable stiffness, with the result that it is very difficult to cause the front end of the side arm to come out of the articulation member.

The sleeve 62 of the base 50 serves as cylinder for an elastic piston 80 having an active end 80a. During rotation of the side arm, this active end 80a cooperates successively with the plane lateral faces, directed vertically, of the rotating member 52. This rotating member generally comprises at least a first and a second plane lateral face 82 and 84 which are perpendicular and adjacent.

The cooperation of the piston and of the active faces serves to define the different positions of the side arm. In this way, the active end 80a of the piston cooperates with the first lateral face 82 of the member 52 to define the position in which the side arm 12 is aligned with the tube 26. To pass to the position of use of the side arms, the piston is compressed, which compression is maximum when its active face cooperates with the rounded angle 83 between the faces 82 and 84. When the active face of the piston cooperates with the second lateral face 84, the position of use is defined and the side arms do not risk being moved apart or returned towards the inside, in untimely manner.

When, as is the case in the example shown, the side arms can adopt the third position in which they are folded at the rear of the frame, the rotating element 52 comprises a third plane, vertical, lateral face 86 parallel to face 82 and adjacent face 84. The active end 80a of the piston 80 cooperates with this third face in order to define the third position of the side arm. FIG. 14 shows the passage of the side arm 12 between its position of use (FIG. 13) and its folded position (FIG. 15), during which the active end 80a of the piston cooperates with the rounded angle 85 which separates the faces 84 and 86.

In the example shown, the piston comprises a cap 88 of which the free end constitutes the active face 80a, and which is disposed in the sleeve 62. A compression spring 90 is interposed between the bottom of the sleeve and the cap 88, and is advantageously housed in a bore in the latter.

It should be noted that the piston is arranged to the rear of the frame and adjacent the tube 26 in order to be concealed when the user is wearing the spectacles. However, this arrangement is not compulsory.

In order to connect together the different parts of each articulation member, the latter comprise two cheek elements 92 and 94 which perform the role of lower and upper covers, cheek 92 being placed against the base 50 and cheek 94 being placed against that face of the rotating element opposite the base 50. One of the two cheeks, for example cheek 92, comprises a stepped sleeve which is housed in the bore of the base 50 and in that, of smaller diameter, of the rotating element 52. This sleeve 96 is threaded and the two cheeks are connected with the aid of a screw 98 which prevents them from rotating with respect to each other, the free end of the sleeve 96 coming into contact with the opposite face of the cheek 94.

I claim:

1. A spectacles frame comprising a frame body, two side arms, means for fixing two spectacles lenses to said frame body and a single tube arranged in an upper portion of said frame body, said tube being disposed above the location of the two lenses and defining a transverse direction, the tube having first and second open opposite ends respectively located at a first and a second lateral end of the upper portion of the frame body, the side arms being capable of being at least partially retracted in said tube in order to adopt a position of rest in which said side arms extend above the two spectacles lenses and of being extracted from the tube in order to adopt a position of use in which said side arms extend in a direction substantially perpendicular to said transverse direction, the side arms being flexible and having each a front end and a rear end, the front ends of the side arms being near to the frame body in a position of use of the spectacles frame and the rear ends of the side of the side arms being remote from the frame body in said position of use, the front ends of the side arms being tapered, thereby enabling the side arms to cross each other in order to be both inserted in said single tube.

2. A spectacles frame as claimed in claim 1, wherein the front ends of the side arms each comprise two inclined faces defining a dihedron.

3. A spectacles frame as claimed as claim 2, wherein the two inclined faces of each side arm intersect on a line of intersection which as a projecting tip.

4. A spectacle frame as claimed in claim 1, comprising a first and a second articulation members respectively located at the first and at the second lateral end of the upper portion of the frame body, the first articulation member comprising a first channel capable of being placed in a first position in which said first channel is aligned with the first end of the tube and in a second position substantially perpendicular to the said first position, said first articulation member further comprising means for wedging the front end of the first side arm when said first side arm is extracted from the tube, the second articulation member comprising a second channel capable of being placed in a first position in which said second channel is aligned with the second end of the tube and in a second position substantially perpendicular to the said first position, said second articulation member further comprising means for wedging the front end of the second side arm when said second side arm is extracted from the tube.

5. A spectacle frame as claimed in claim 4, wherein the first and second articulation members each comprise a fixed base and a rotating element, disposed on the fixed base and capable of rotating with respect to said fixed base about an axis of rotation, the fixed bases of the first and second articulation members being respectively connected to the first end and to the second end of the tube, the first and second channels each comprising a base face and two lateral faces and being respectively arranged in the rotating element of the first articulation member and in the rotating element of the second articulation member, the rotating element of the first articulation member presenting a first abutment face substantially perpendicular to one of the faces of the first channel and directed towards the first end of the tube in the first position of said first channel and the front end of the first side arm including a beak having an active face which is directed towards the rear end of said first side arm and is capable of abutting against the first abutment face, and the rotating element of the second articulation member including a second abutment face substantially perpendicular to one of the faces of the second channel and directed towards the second end of the tube in the first position of said second channel and the front end of the second side arm including a beak having an active face which is directed towards the rear end of said second side arm and is capable of abutting against the second abutment face.

6. A spectacles frame as claimed in claim 5, wherein the first and second side arms respectively have a first and a second concave zone, said concave zones being respectively situated in a vicinity of the front end of the first side arm and in a vicinity of the front end of the second side arm, wherein the first and second articulation members respectively comprise a first and a second elastic member respectively capable of projecting in the first and in the second channel in order to respectively cooperate with the first and the second concave zone and thereby to respectively wedge the first and the second side arms when said arms are extracted from the tube, the first and second elastic members being further capable of being elastically retracted to respectively allow the first side arm to slide in the first channel and the second side arm to slide in the second channel.

7. A spectacles frame as claimed in claim 6, wherein the rotating elements of the first and second articulation members respectively comprise a first and a second annular groove centered on the respective axis of rotation thereof and wherein the first and second elastic members are constituted by a portion of elastic ring respectively disposed in said first and second annular grooves and fixed in rotation, said first elastic member having a free end which is angularly close to the first end of the tube and a fixed end which is angularly remote from said first end of the tube, and the second elastic member having a free end which is angularly close to the second end of the tube and a fixed end which is angularly remote from said second end of the tube.

8. A spectacles frame as claimed in claim 5, wherein the rotating elements of the first and second articulation members each have at least a first and a second plane lateral faces which are perpendicular and adjacent to one another, and the first and second articulation members respectively comprise a first and a second elastic piston, the first elastic piston having an active end capable of cooperating with one of the plane lateral faces of the rotating element of the first articulation member in order to define one position of the first side arm and of cooperating with another one of the plane lateral faces of the rotating element of the first articulation member in order to define another position of the first side arm, and the second elastic piston having an active end capable of cooperating with one of the plane lateral faces of the rotating element of the second articulation member in order to define one position of the second side arm and of cooperating with another one of the plane lateral faces of the rotating element of the second articulation member in order to define another position of the second side arm.

9. A spectacles frame as claimed in claim 8, wherein the rotating elements of the first and second articulation members each have a third plane lateral face which is parallel to respective first plane faces thereof and which is adjacent to the respective second plane faces thereof, and wherein the active end of the first elastic piston is capable of cooperating with the third plane lateral face of the rotating element of the first articulation member so as to define a further position of the first side arm in which said first side arm is folded on a rear side of the frame body, and the active end of the second elastic piston is capable of cooperating with the third plane lateral face of the rotating element of the second articulation member so as to define a further position of the second side arm in which said second side arm is folded on a rear side of the frame body.

10. A spectacles frame as claimed in claim 8, wherein the first and second pistons respectively comprise a first and a second cap and a first and a second compression ring, the first cap being slidably disposed in a first cylinder which is integral with the fixed base of the first articulation member and the first compression ring being housed in the first cylinder, whereas the second cap is slidably disposed in a second cylinder which is integral with the fixed base of the second articulation member and the second compression ring is housed in the second cylinder.

11. A spectacles frame as claimed in claim 9, wherein the first and second pistons respectively comprise a first and a second cap and a first and a second compression ring, the first cap being slidably disposed in a first cylinder which is integral with the fixed base of the first articulation member and the first compression ring being housed in the first cylinder, whereas the second cap is slidably disposed in a second cylinder which is integral with the fixed base of the second articulation member and the second compression ring is housed in the second cylinder.

* * * * *